United States Patent [19]

Kaneko et al.

[11] 3,711,831

[45] Jan. 16, 1973

[54] PATTERN SCANNING SYSTEM

[75] Inventors: Toyohisa Kaneko, Tokyo; Nobuhiko Sezaki, Yokohama; Hiroshi Katagiri, Kawasak, all of Japan

[73] Assignee: Matsushita Electric Industrial Co., Ltd., Osaka, Japan

[22] Filed: Feb. 2, 1971

[21] Appl. No.: 112,050

Related U.S. Application Data

[63] Continuation of Ser. No. 690,608, Dec. 14, 1967, abandoned.

[30] Foreign Application Priority Data

Dec. 21, 1966 Japan ................................41/84983

[52] U.S. Cl. ..............340/146.3 F, 178/6.8, 178/7.7, 315/23, 340/146.3 AE

[51] Int. Cl. ............................H01j 29/70, G06k 9/00

[58] Field of Search ...340/146.3, 146.3 AE; 178/6.8, 178/7.7; 315/10, 25, 23, 26

[56] References Cited

UNITED STATES PATENTS

| | | | |
|---|---|---|---|
| 2,817,787 | 12/1957 | Kovasznay | 178/7.7 |
| 3,002,125 | 9/1961 | Stevens et al. | 315/23 |
| 3,239,606 | 3/1966 | Chatten et al. | 178/7.2 |
| 3,339,452 | 9/1967 | Sass et al. | 178/6.8 X |

*Primary Examiner*—Daryl W. Cook
*Assistant Examiner*—Leo H. Boudreau
*Attorney*—Stevens, Davis, Miller & Mosher

[57] ABSTRACT

A pattern search means used for a pattern recognition system, wherein a pattern such as a written character is searched by an electronic beam spot which scans the field along a line having at least two parts of different inclination such as a sinusoidal waveform, semicircle or bent straight line, instead of a single straight line as used in the conventional system.

4 Claims, 16 Drawing Figures

INVENTORS
TOYOHISA KANEKO,
NOBUHIKO SEZAKI,
HIROSHI KATAGIRI

BY Stevens, Davis, Miller & Mosher
ATTORNEYS

INVENTORS
TOYOHISA KANEKO,
NOBUHIKO SEZAKI,
HIROSHI KATAGIRI,

BY

Stevens, Davis, Miller & Mosher
ATTORNEYS

INVENTORS
TOYOHISA KANEKO,
NOBUHIKO SEZAKI,
HIROSHI KATAGIRI,
BY Stevens, Davis, Miller & Mosher
ATTORNEYS

PATTERN SCANNING SYSTEM

CROSS-REFERENCE TO RELATED APPLICATION

This application is a Continuation of co-pending U.S. Pat. application, Ser. No. 690,608 filed Dec. 14, 1967 and abandoned upon the filing of the present application.

This invention relates to a pattern identifying system, that is, a system for identifying a lineal pattern such as a written character, particularly to an improved system for finding one of the end points of a lineal pattern.

Hitherto, various systems for identifying a pattern, or particularly a character, have been proposed, among which one of the most promising methods is to follow the pattern along the line and to derive all of essential information from that follow-up operation. In this method, one point (actually, one of the end points) of the lineal pattern must be found before starting the follow-up of the pattern. This finding operation is referred to as search scanning or simply search.

An object of this invention is to provide an ingenious system by which the end point of a lineal pattern can be found easily and assuredly.

Figure 2:
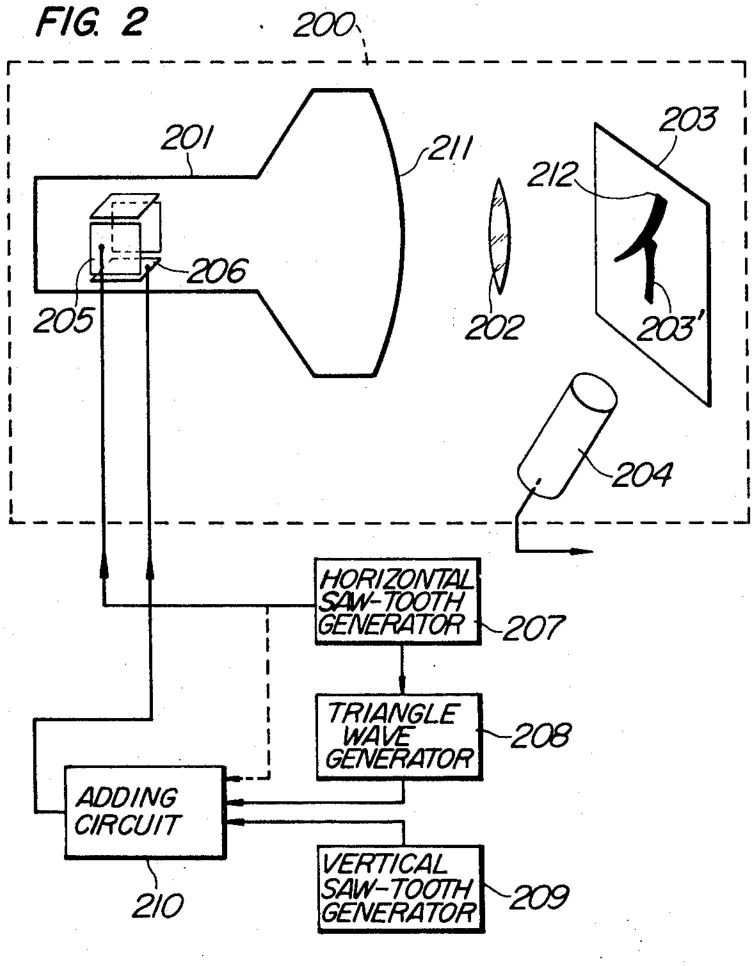

This invention will be described in detail hereunder with reference to the attached drawings, in which;

FIGS. 1*a*, 1*b*, 1*c* and 1*d* are diagrams for explaining the conventional search scanning systems;

FIGS. 1*e*, 1*f*, 1*g*, 1*h* and 1*i* show examples of the rasters in pattern identifying systems of this invention;

FIG. 2 is a block diagram showing the essential part of a pattern identifying diagram embodying this invention; and, FIGS. 3*a* – 3*f* show waveforms of the deflecting signals in the systems as shown in FIG. 2.

Figure 1A:
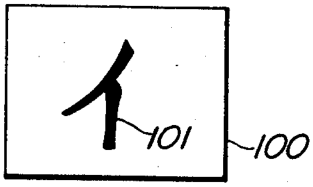
Figure 1B:
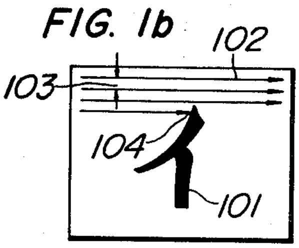
Figure 1C:
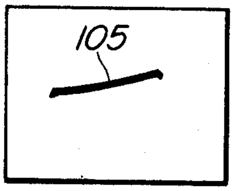

Now, referring to FIG. 1a, there is shown one of the Japanese characters (hereinafter, referred to as first character) 101 written on a paper 100. With the conventional systems, the field is scanned by trace 102 of an electron beam with uniform spaces 103 from the top to the bottom of the paper 100 as shown in FIG. 1b, in the same manner as in a television receiver. If the scanning beam hits the top end 104 of the first character 101 as shown in FIG. 1*b*, this is detected, and the scanning operation or search is sustained, with the beam retained at the point 104. Then, a follow-up along the stroke or outline of the character is initiated, starting from the point 104. A character is identified by the electric signal derived from the follow-up operation of the beam. However, explanation about the follow-up operation in the system will not be given, as this is not within the scope of this invention.

Figure 1D:
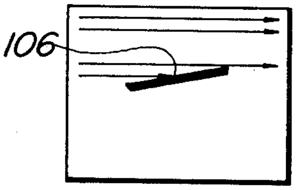

In the example of said first character, it will be seen that the finding of the end 104 in the search is achieved quite satisfactorily by a conventional way of scanning. However, if the character to be found is, for example, character 105 shown in FIG. 1*c*, which is another Japanese character and hereinafter referred to as second character, there will not be much chance for the scanning beam to hit the end of the character 105, as the beam has a certain width, and the beam will often hit another portion 106 of the character in the search scanning as shown in FIG. 1*d*. Accordingly, the follow-up operation starts from a point other than one of the end points, thus dividing this second character into two parts. Identifying a character from such divided follow-up requires an extremely complicated device.

According to this invention, a system by which the end of a character can be easily and assuredly found, is provided.

Figure 1E:
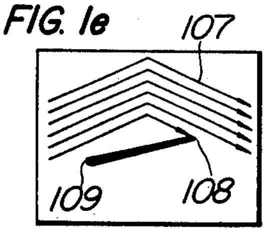
Figure 1F:
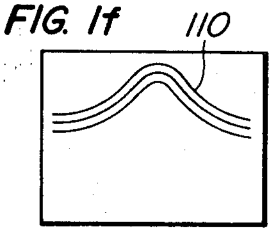

For example, if the search scanning is performed using an electron beam whose trace presents parallel bent lines 107 as shown in FIG. 1*e*, either one of the end points 108 or 109 of the second character 105 can be hit by the beam without fail, being less affected by the width of the beam. The form of the scanning trace of the beam may be either one of the patterns shown in FIGS. 1*f*, 1*g*, 1*h* and 1*i*. FIG. 1f shows sinusoidal traces 110 and FIG. 1*g* circular traces 111. FIGS. 1*h* and 1*i* show unsymmetrically bent straight lines 112 and 113, respectively.

Figures 3A, 3B, 3C, 3D, 3E, 3F:
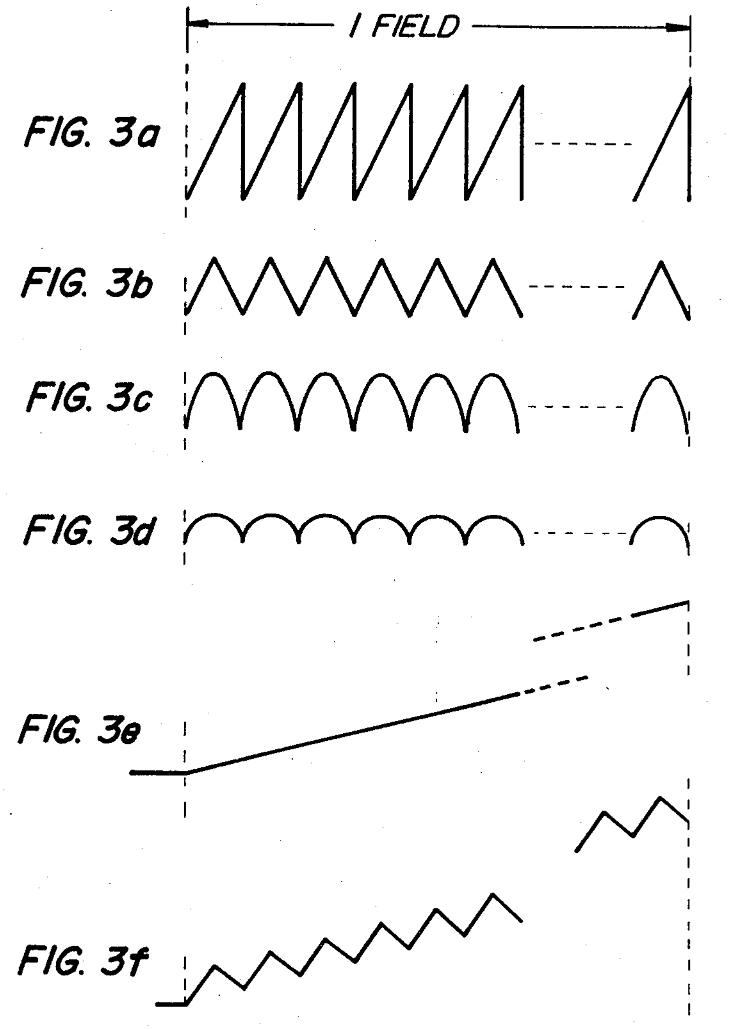

Now, an arrangement by which the above-mentioned search scanning is performed will be explained. Referring to FIG. 2, assume that character 203' on paper 203 is to be identified. The flying spot scanner 200 contains cathode ray tube 201 which has horizontal deflecting plates 205, vertical deflecting plates 206 and fluorescent panel 211 which is to be scanned by the bright spot of the beam; optical system 202 for projecting the bright spot on the panel 211 onto the paper 203; and photo-electronic multiplying tube 204 for converting the light reflected from the paper 203 into an electric signal. The other components of the system include horizontal base saw-tooth wave generator 207 for generating a saw-tooth voltage as shown in FIG. 3*a;* triangle wave generator 208 for generating a triangular voltage in synchronization with said saw-tooth voltage (FIG. 3*a*) as shown in FIG. 3*b;* vertical axis saw-tooth wave generator 209 which generates a saw-tooth voltage as shown in FIG. 3*e;* and adding circuit 210 in which the outputs from the triangle wave generator 208 and the vertical axis saw-tooth wave generator 209 are added, the resultant output being supplied to the vertical deflecting plates 206. Thus, with the horizontal deflecting plates 205 fed by a saw-tooth voltage as shown in FIG. 3*a* and the vertical deflecting plates 206 fed by a saw-tooth voltage modulated, in a way, by a triangular voltage as shown in FIG. 3*f*, symmetrically bent parallel lines as shown in FIG. 1*e* are traced by the bright spot of the beam.

If the bright spot projected on the paper 203 hits, while scanning, the end portion 212 of the character 203', the light of the bright spot reflected from the paper 203 will suddenly fail to enter the photo-electronic multiplying tube 204. An end point of the character thus having been found, the search scanning is immediately withheld, with the bright spot retained at the end point 212, and the follow-up along the pattern is then initiated.

Figure 1G:
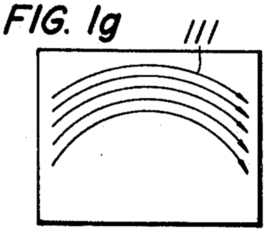
Figure 1H:
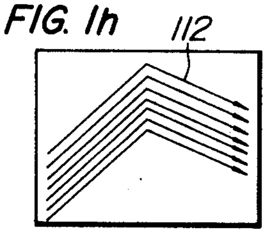
Figure 1I:
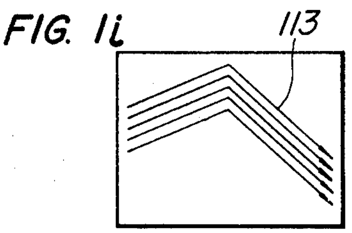

It will be understood that a sinusoidal or circular scanning as shown respectively in FIG. 1*f* or 1*g* is attained by providing to the vertical deflecting plates a rectified sinusoidal voltage as shown in FIG. 3*c* or a semicircular voltage as shown in FIG. 3*d* from the triangle wave generator 208 instead of the triangular voltage. Further, if a portion of the output from the horizontal saw-tooth wave generator 207 is fed to the adding circuit 210, inclined bent lines as shown in FIG. 1*h* will be traced by the beam. The traces shown in FIG. 1*i* will be obtained when the output of the horizontal saw-tooth wave generator 207 is fed to the adding circuit in reversed polarity.

It will be easily seen that if the signals supplied to the horizontal and vertical deflecting plates 205 and 206 are exchanged for each other, the paper 203 will be sequentially scanned from the left to the right.

As described above, according to this invention, the search scanning is performed by sequentially shifting traces of a beam which comprise at least two parts of different inclination like a triangular, sinusoidal or circular wave, and an end point of a pattern can be found without fail, being less affected by the pitch of the traces, thus allowing the followup system to be less complicated.

What is claimed is:

1. A pattern search means used for a pattern recognition system, comprising, in combination: means for scanning a phosphor screen with an electron beam spot, said scanning means comprising horizontal and vertical deflection plates operatively associated with said electron beam spot; means for generating a saw-tooth horizontal sweep voltage connected to said horizontal deflection plates; means for generating a saw-tooth vertical sweep voltage; means for generating a periodically varying voltage in one-to-one synchronization with said horizontal sweep voltage, the output of said horizontal sweep generating means being connected to the input of said periodic voltage generating means; means for superimposing the output of said periodic voltage generating means on said vertical sweep voltage, said superimposing means being connected to said vertical deflection plates to thereby produce a scanning trace having at least two parts of different inclination; optical means for projecting an image of said phosphor screen on a sheet which has a pattern to be recognized thereon; and photo-electric means for detecting the image of said beam spot on said sheet when said image hits said pattern.

2. A pattern search means as defined in claim 1, wherein said means for generating a periodically varying voltage is a triangular wave signal generator.

3. A pattern search means as defined in claim 1, wherein said means for generating a periodically varying voltage is a sinusoidal wave signal generator.

4. A pattern search means as defined in claim 1, wherein said means for generating a periodically varying voltage is a semi-circular wave signal generator.

* * * * *